United States Patent
Kambe et al.

(10) Patent No.: US 11,867,646 B2
(45) Date of Patent: Jan. 9, 2024

(54) TOTAL REFLECTION X-RAY FLUORESCENCE SPECTROMETER

(71) Applicant: Rigaku Corporation, Akishima (JP)

(72) Inventors: Makoto Kambe, Takatsuki (JP); Kazuhiko Omote, Akishima (JP); Toshifumi Higuchi, Takatsuki (JP); Tsutomu Tada, Takatsuki (JP); Hajime Fujimura, Takatsuki (JP); Masahiro Nonoguchi, Akishima (JP); Licai Jiang, Auburn Hills, MI (US); Boris Verman, Auburn Hills, MI (US); Yuriy Platonov, Auburn Hills, MI (US)

(73) Assignee: RIGAKU CORPORATION, Tokyo (JP)

( * ) Notice: Subject to any disclaimer, the term of this patent is extended or adjusted under 35 U.S.C. 154(b) by 0 days.

(21) Appl. No.: 18/034,886

(22) PCT Filed: Nov. 1, 2021

(86) PCT No.: PCT/JP2021/040221
§ 371 (c)(1),
(2) Date: May 2, 2023

(87) PCT Pub. No.: WO2022/118585
PCT Pub. Date: Jun. 9, 2022

(65) Prior Publication Data
US 2023/0400423 A1    Dec. 14, 2023

(30) Foreign Application Priority Data
Dec. 1, 2020  (JP) .................. 2020-199366

(51) Int. Cl.
*G01N 23/223*    (2006.01)
(52) U.S. Cl.
CPC .................. *G01N 23/223* (2013.01)

(58) Field of Classification Search
CPC ....... G01N 2223/076; G01N 2223/079; G01N 23/223; G01N 2223/08; G01N 23/2251;
(Continued)

(56) References Cited

U.S. PATENT DOCUMENTS

| 5,406,609 A | 4/1995 | Arai et al. |
| 5,742,658 A | 4/1998 | Tiffin et al. |

(Continued)

FOREIGN PATENT DOCUMENTS

| EP | 1715503 B1 | 1/2014 | |
| ES | 2271277 T3 * | 4/2007 | ............. B82Y 10/00 |

(Continued)

OTHER PUBLICATIONS

International Search Report dated Jan. 25, 2022, for International Patent Application PCT/JP2021/040221 with English translation, pp. 1-5.

(Continued)

*Primary Examiner* — Don K Wong
(74) *Attorney, Agent, or Firm* — HEA LAW PLLC

(57) ABSTRACT

Provided is a total reflection X-ray fluorescence spectrometer which has high analysis sensitivity and analysis speed. The total reflection X-ray fluorescence spectrometer includes: an X-ray source that has an electron beam focal point having an effective width in a direction parallel to a surface of a sample, and orthogonal to an X-ray irradiation direction, that is larger than a dimension in the irradiation direction; a reflective optic that has an effective width in the orthogonal direction that is larger than that of the electron beam focal point, and has a curved surface in the irradiation direction; and a plurality of detectors that are arranged in a row in the orthogonal direction, and are configured to (Continued)

measure intensities of fluorescent X-rays emitted from the sample irradiated with primary X-rays focused by the reflective optic.

8 Claims, 6 Drawing Sheets

(58) Field of Classification Search
CPC ...... G01N 23/23; G01N 23/2255; G21K 1/06; G21K 1/062; G21K 2201/064; G21K 5/00; G21K 5/04; G21K 2201/06
See application file for complete search history.

(56) References Cited

U.S. PATENT DOCUMENTS

| | | | |
|---|---|---|---|
| 5,930,586 | A | 7/1999 | Jain et al. |
| 6,421,414 | B1 | 7/2002 | Huber |
| 2004/0131146 | A1 | 7/2004 | Chen et al. |
| 2015/0204806 | A1 | 7/2015 | Mazor et al. |
| 2019/0227005 | A1 | 7/2019 | Ogata et al. |
| 2022/0120698 | A1 | 4/2022 | Norman et al. |
| 2022/0120699 | A1 | 4/2022 | Norman et al. |

FOREIGN PATENT DOCUMENTS

| | | |
|---|---|---|
| JP | H0682400 A | 3/1994 |
| JP | H085584 A | 1/1996 |
| JP | H0961382 A | 3/1997 |
| JP | H1140632 A | 2/1999 |
| JP | H11108861 A | 4/1999 |
| JP | 2921910 B2 | 7/1999 |
| JP | 2001165875 A | 6/2001 |
| JP | 2006194632 A | 7/2006 |
| JP | 2010033992 A | 2/2010 |
| TW | 201531696 A | 8/2015 |
| TW | 202219495 A | 5/2022 |
| WO | 2018012527 A1 | 1/2018 |

OTHER PUBLICATIONS

Office Action dated Jun. 15, 2023, for corresponding TW Patent Application No. 111118710, pp. 1-5.
Veloso J.F.C.A. et. al: "Energy resolved X-ray fluorescence imaging based on a micropattern gas detector", Spectrochimica ACTA. Part B: Atomic Spectroscopy, vol. 65, Mar. 1, 2010, pp. 241-247, XP027016890, ISSN: 0584-8547 [retrieved on Mar. 15, 2010], pp. 1-7.
Search Report dated Nov. 8, 2023, for corresponding EP Patent Application No. 21900340.7, pp. 1-9.

* cited by examiner (a)

(b)

(a)

(b)

(c)

(d)

(e)

(f)

(g)

(h)

(i)

(j)

(k)

TOTAL REFLECTION X-RAY FLUORESCENCE SPECTROMETER

CROSS REFERENCE TO RELATED APPLICATIONS

This application is a National Stage of International Application No. PCT/JP2021/040221 filed on Nov. 1, 2021, which claims priority from Japanese Patent Application 2020-199366, filed on Dec. 1, 2020. The contents of the above document is incorporated herein by reference in its entirety.

TECHNICAL FIELD

The present invention relates to a total reflection X-ray fluorescence spectrometer.

BACKGROUND ART

It is well known that an X-ray fluorescence spectrometer is a device for analyzing elements contained in a sample. In the X-ray fluorescence spectrometer, primary X-rays irradiate the sample and executes analysis based on intensities and energy of fluorescent X-rays emitted from the sample. In particular, in order to analyze a small amount of contamination on a surface of a sample and the like, total reflection X-ray fluorescence spectrometer is used, in which primary X-rays irradiate the surface of the sample with the total reflection critical angle or less.

In recent years, contamination detection is key for the advanced semiconductor industry, and in order to achieve the quick determination of an extremely small amount of impurities and the like, there has been a demand for improvement in analysis sensitivity and analysis speed. As one method for improving the analysis sensitivity and the analysis speed, there is a method of increasing intensities of the primary X-rays with which the surface of the sample is irradiated.

For example, in Patent Literature 1 below, there is disclosed a configuration in which primary X-rays emitted from a point light source are focused by a multilayer monochromator having a concave ellipsoidal surface, and a sample is irradiated with the focused primary X-rays having high intensities.

Moreover, in Patent Literature 2 to Patent Literature 7 below, it is disclosed that a plurality of detectors or a detector having a wide detection area is used to measure fluorescent X-rays generated from an irradiated region, to thereby increase intensities of the fluorescent X-rays that can be detected per unit time.

CITATION LIST

Patent Literature

[PTL 1] JP 6-82400 A
[PTL 2] JP 8-5584 A
[PTL 3] US 5742658 A
[PTL 4] JP 2001-165875 A
[PTL 5] JP 9-61382 A
[PTL 6] JP 11-40632 A
[PTL 7] JP 2921910 B2

SUMMARY OF INVENTION

Technical Problem

A detected intensity of the fluorescent X-rays generated from the sample depends on the intensity of the primary X-rays with which the sample is irradiated and numerical aperture of the detector. Accordingly, as described in Patent Literature 2 to Patent Literature 7, there have hitherto been provided ideas for increasing the detected fluorescent X-ray by increasing the area of the detector. In addition, it is possible to further improve the analysis sensitivity and also the analysis speed by increasing the intensities of the primary X-rays with which the sample is irradiated.

However, when the X-ray source is a point light source as in Patent Literature 1 above, a filament current of an electron beam source is increased, there is a risk of causing vaporization, deformation, and melting of the filament by heat, which may result in shortening of the life of the filament. It is known that even in a case of using a cold cathode type electron source, the life is shortened when the electron beam current is increased. Moreover, the target will also be damaged by the increased electron beam current and may further be melted.

The present invention has been made to overcome the above-mentioned problems, and has an object to provide a total reflection X-ray fluorescence spectrometer which has high analysis sensitivity and analysis speed.

Solution to Problem (1) According to one aspect of the present disclosure, there is provided a total reflection X-ray fluorescence spectrometer, including: an X-ray source that has an electron beam focal point having an effective width in a direction parallel to a surface of a sample and orthogonal to an X-ray irradiation direction that is larger than a dimension in the X-ray irradiation direction; a reflective optic that has an effective width in the direction parallel to the surface of the sample and orthogonal to the X-ray irradiation direction that is larger than the effective width of the electron beam focal point, and has a curved cross section in a plane containing the X-ray irradiation direction and being perpendicular to the surface of the sample; and a plurality of detectors that are directed toward the surface of the sample, are arranged in a row in the direction orthogonal to the X-ray irradiation direction, and are configured to measure intensities of fluorescent X-rays generated from the sample irradiated with X-rays focused by the reflective optic.

(2) In the above-mentioned aspect of the present disclosure, the X-ray irradiation width in the direction orthogonal to the X-ray irradiation direction on the surface of the sample is 60 mm or larger.

(3) In the above-mentioned aspect of the present disclosure, the effective width of the reflective optic in the direction parallel to the surface of the sample and orthogonal to the X-ray irradiation direction is 30 mm or larger.

(4) In the above-mentioned aspect of the present disclosure, the effective width of the electron beam focal point in the direction parallel to the surface of the sample and orthogonal to the X-ray irradiation direction is 15 mm or larger.

(5) In the above-mentioned aspect of the present disclosure, the cross section of a reflection surface of the reflective optic in the direction parallel to the surface of the sample and orthogonal to the X-ray irradiation direction is linear.

(6) In the above-mentioned aspect of the present disclosure, the plurality of detectors include detectors having different characteristics.

(7) In the above-mentioned aspect of the present disclosure, the different characteristics are a detection area, an energy resolution, a spatial resolution, or energy sensitivity.

(8) In the above-mentioned aspect of the present disclosure, the plurality of detectors are arranged symmetrically with respect to the plane containing the X-ray irradiation direction and being perpendicular to the surface of the sample.

Advantageous Effects of Invention

According to the present disclosure, the total reflection X-ray fluorescence spectrometer which has high analysis sensitivity and analysis speed can be achieved.

DESCRIPTION OF EMBODIMENTS

Figure 1:
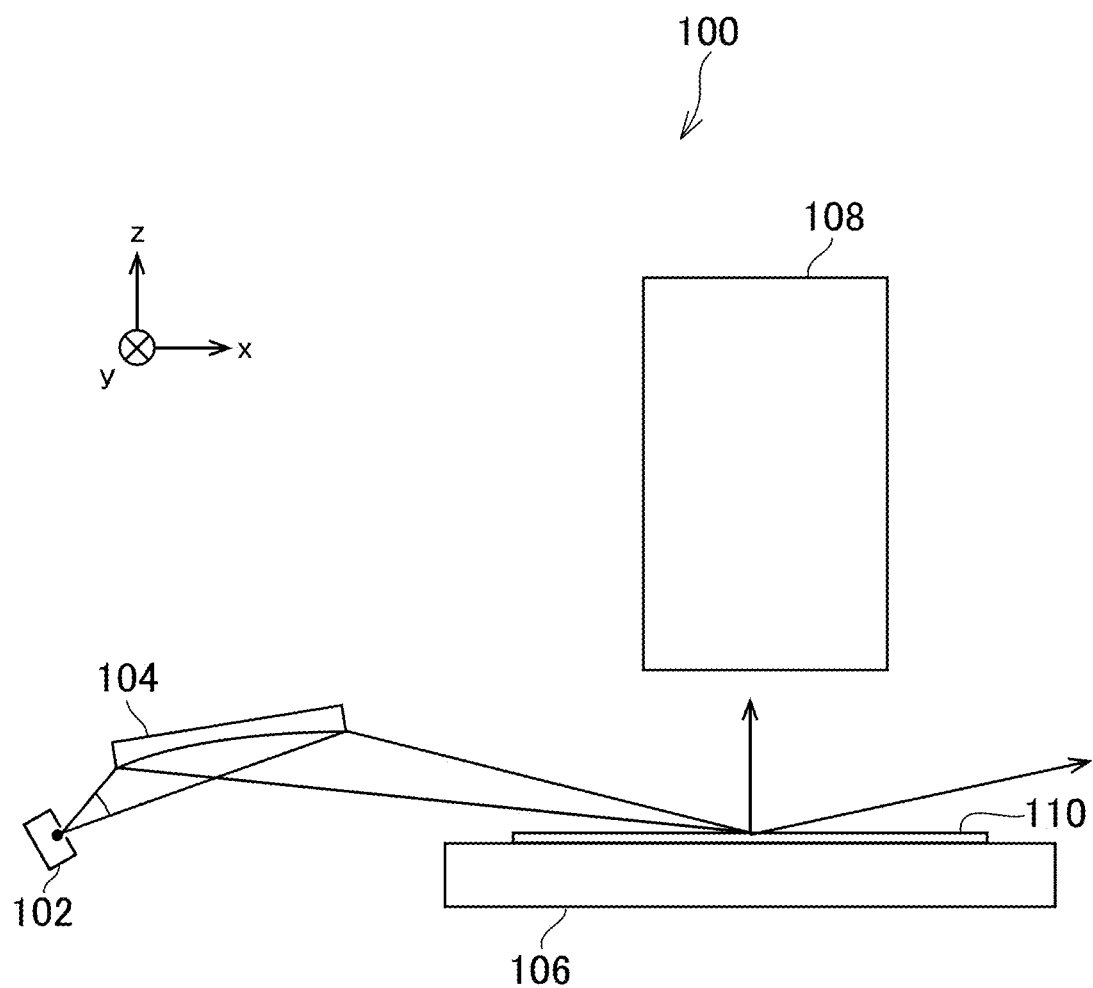
FIG. 1 is a view schematically illustrating an overall configuration of a total reflection X-ray fluorescence spectrometer.

As illustrated in FIG. 1, a total reflection X-ray fluorescence spectrometer 100 irradiates a surface of a sample 110 such as a silicon wafer with primary X-rays at a total reflection critical angle or less. Moreover, the total reflection X-ray fluorescence spectrometer 100 acquires a spectrum indicating a relationship between intensities and energy of emitted fluorescent X-rays. The total reflection X-ray fluorescence spectrometer 100 uses this spectrum to analyze elements included in the sample 110. Specifically, for example, the total reflection X-ray fluorescence spectrometer 100 includes an X-ray source 102, a reflective optic 104, a sample stage 106, and a detection unit 108.

Figure 2:
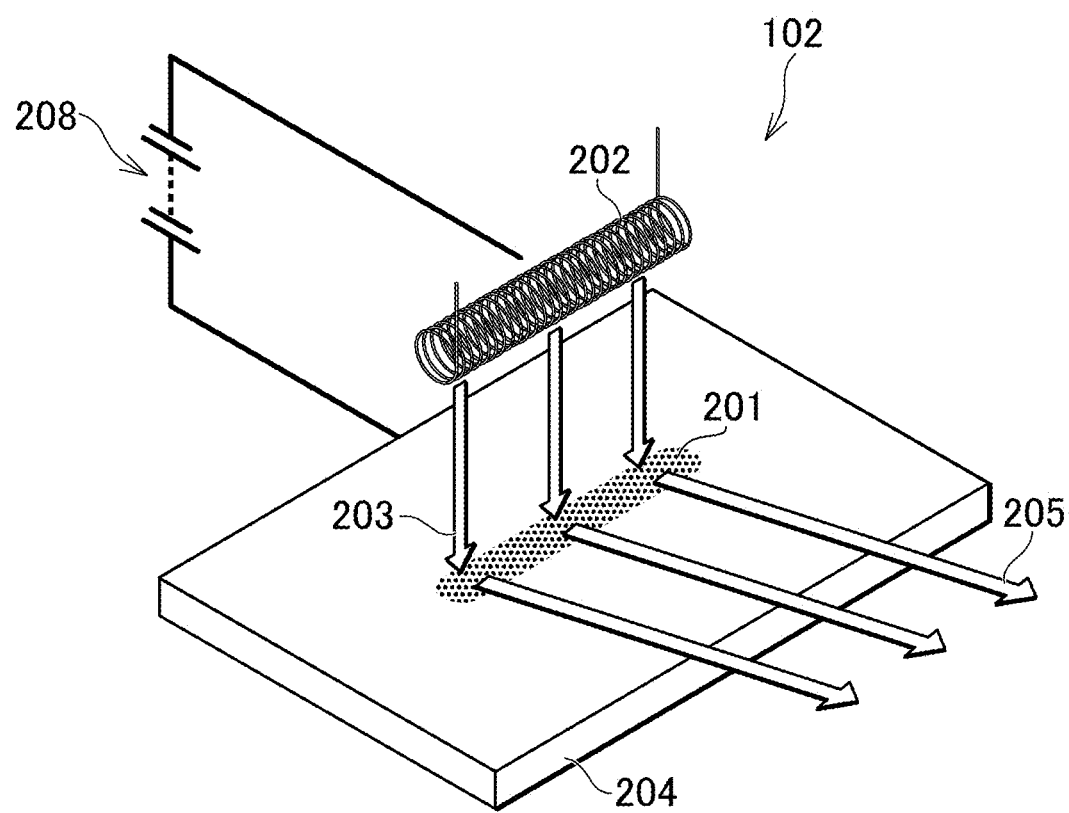
FIG. 2 is a view schematically illustrating an X-ray source.
Figure 2:
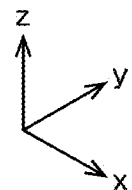

The X-ray source 102 generates the primary X-rays. A direction orthogonal to an irradiation direction (center direction of the irradiation) of the generated primary X-rays and parallel to a surface of the sample 110 is hereinafter referred to as a y-axis direction. Moreover, a direction parallel to the surface of the sample 110 and orthogonal to the "y" axis is referred to as an x-axis direction. Further, a direction perpendicular to the surface of the sample 110 is referred to as a z-axis direction. For example, as illustrated in FIG. 2, the X-ray source 102 includes an electron beam source 202, a target 204, and a power supply 208.

Specifically, when the X-ray source 102 is of the hot cathode type, for example, the electron beam source 202 is a filament, and is applied with a negative voltage by the power supply 208, to thereby generate electron beams 203. The target 204 is applied with a positive voltage by the power supply 208, and is irradiated with the electron beams 203 generated from the electron beam source 202. Primary X-rays 205 are generated from an electron beam focal point 201 on the target 204 irradiated with the electron beams 203. As a material of the target 204, a material for generating the primary X-rays having a high excitation efficiency in correspondence with energy of an absorption edge of an element to be measured is appropriately selected. The filament and the target 204 are arranged inside a housing to keep the vacuum environment. This housing has an opening as needed. A film made of a material which transmits the primary X-rays is formed on the opening. This film is made of, for example, beryllium. However, when absorption by the window material causes a problem depending on the wavelength of the X-rays to be used, the X-ray source 102, the optical device 104, and the sample 110 may be arranged in the same vacuum chamber so that the window material can be omitted. In the example illustrated in FIG. 2, the primary X-rays 205 generated from the target 204 are exited at an appropriate exit angle, and are emitted in a direction toward a position at which the reflective optic 104 is arranged.

The electron beam focal point 201 on the target 204 has an effective width in the direction (that is, the y-axis direction) parallel to the sample surface, and orthogonal to the X-ray irradiation direction for generating the X-rays, that is larger than a dimension in the X-ray irradiation direction. Specifically, for example, when the electron beam source 202 is a filament, the electron beam source 202 has such a shape that a wire made of tungsten is wound in a spiral shape about a center axis of a winding axis in the y-axis direction. Dimensions along both the "x" axis and the "y" axis of the target 204 are larger than dimensions of the filament, and the electron beams 203 generated from the electron beam source 202 irradiate, for example, a region having a length of 15 mm in the y-axis direction.

Figure 3:
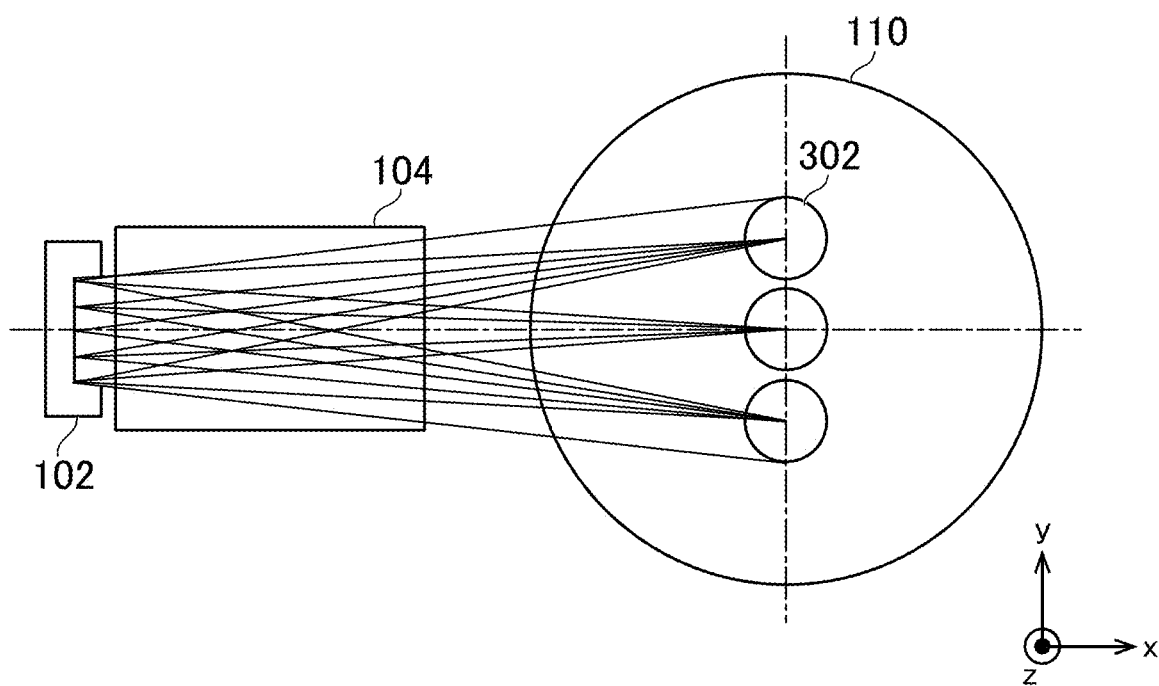
FIG. 3 are views illustrating paths of primary X-rays.
Figure 3:
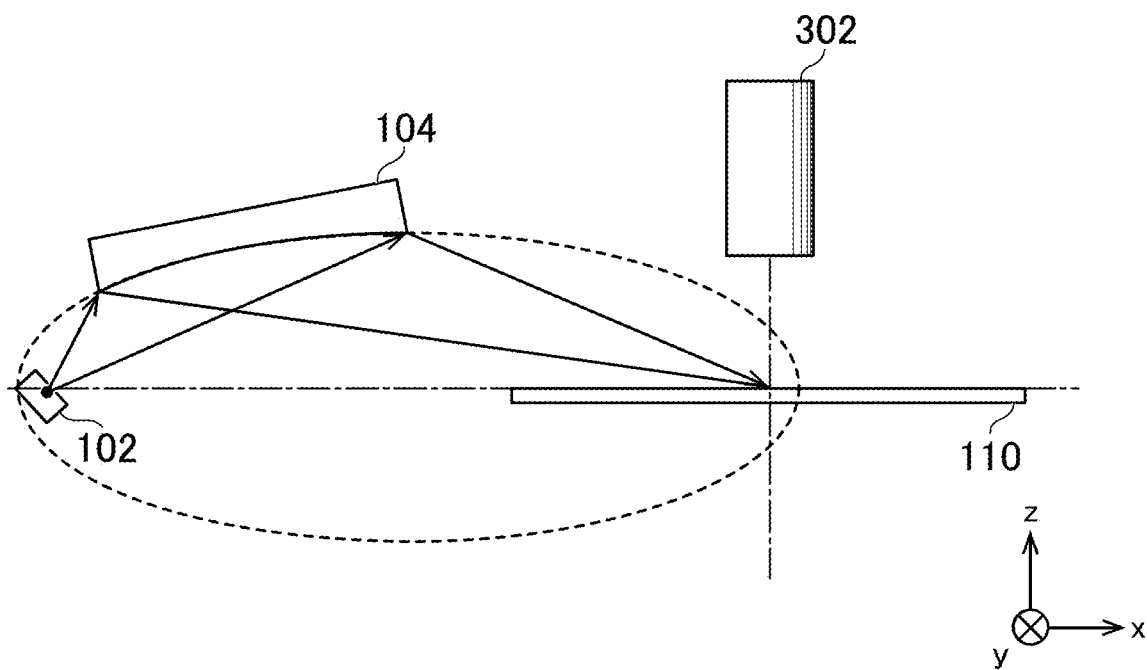

The reflective optic 104 has an effective width for spectrally diffracting the X-rays in the direction (that is, y-axis direction) parallel to the surface of the sample, and orthogonal to the X-ray irradiation direction, that is larger than the effective width of the electron beam focal point 201, and has a curved surface in the irradiation direction. Specifically, description is given with reference to, for example, FIG. 3(a) and FIG. 3(b). FIG. 3(a) is an explanatory view illustrating optical paths of the primary X-rays, as viewed from above the sample 110 (that is, in the z-axis direction). FIG. 3(b) is an explanatory view illustrating the optical paths of the primary X-rays, as viewed from a lateral side of the sample 110 (that is, toward the y-axis direction).

As illustrated in FIG. 3(a) and FIG. 3(b), the reflective optic 104 is a concave shape having the curved cross section in a plane containing the X-ray irradiation direction and being perpendicular to the surface of the sample. This curved surface is a part of an ellipsoid on an xz plane. One focal point of this ellipsoid is the X-ray source 102, and another focal point is a measurement position on the sample 110. An multilayer monochromator is formed on the curved surface, and reflects only X-rays having a specific wavelength through multilayer interference. It is not always required that the reflective optic 104 be the multilayer monochromator. The reflective optic 104 may be a Johansson curved crystal or a logarithmic spiral curved crystal with a curved surface being a logarithmic spiral curve. In the example illustrated in FIG. 3(a), a measurement position is a region which has a certain length in the y-axis direction from a center of a disk-shaped substrate.

Moreover, the reflective optic 104 has an effective width in the direction (that is, the y-axis direction) parallel to the surface of the sample, and orthogonal to the X-ray irradiation direction, that is larger than the effective width of the electron beam focal point. Accordingly, a component which diverges in the y-axis direction in the primary X-rays emitted from the X-ray source 102 can be reflected by the reflective optic 104, and the surface of the sample 110 can be irradiated with the reflective X-rays. The length of the reflective optic in the y-axis direction is, for example, 40 mm. It is preferred that the effective width of the reflective optic in the direction parallel to the surface of the sample and orthogonal to the X-ray irradiation direction be 30 mm or larger. As a result, as illustrated in FIG. 3(a), a wide range of the sample 110 is irradiated with the X-rays having sufficient intensities. For example, it is preferred that the X-ray irradiation width in the direction orthogonal to the X-ray irradiation direction be 60 mm or larger on the surface of the sample.

In practice, the length of the measurement region in the y-axis direction can be extended to approximately 80 mm, thereby being capable of increasing a total intensities of the primary X-rays with which the surface of the sample 110 is irradiated. Hitherto, the lengths of the electron beam focal point 201 and the reflective optic 104 in the y-axis direction have been short, and hence the irradiation region of the X-rays in the y-axis direction on the surface of the sample has been limited to the vicinity of the center of the sample 110. Accordingly, a region irradiated with the X-rays at sufficient intensities on the surface of the sample has been, for example, approximately from 20 mm to 30 mm. As described later, according to this embodiment, a region approximately three times as wide as that of the conventional system can be irradiated with the primary X-rays while the X-ray intensity in the unit area is maintained.

The reflective optic 104 may be in a cylindrical shape in which a cross section of the reflection surface in the direction (that is, the y-axis direction) parallel to the surface of the sample and orthogonal to the X-ray irradiation is linear.

The sample 110 to be analyzed is placed on the sample stage 106. Specifically, for example, a silicon wafer used to manufacture a semiconductor device is placed on the sample stage 106. Moreover, the sample stage 106 moves the sample so that the measurement position is located directly below detectors 302. Impurities such as Ni may adhere to the silicon wafer in a semiconductor factory for manufacturing or processing the silicon wafer. The silicon wafer is irradiated with the primary X-rays at a plurality of positions through the movement of the silicon wafer by the sample stage 106. As a result, the total reflection X-ray fluorescence spectrometer 100 can analyze whether or not the impurities adhere to the surface of the silicon wafer.

The detection unit 108 includes the detectors 302 and a counter. The detector 302 is, for example, a semiconductor detector such as a silicon drift detector (SDD). The plurality of detectors 302 are opposed to the surface of the sample, are arranged in a row in the direction orthogonal to the irradiation direction, and measure the intensities of the fluorescent X-rays (fluorescent X-rays and scattered rays) emitted from the sample 110 irradiated with the primary X-rays focused by the reflective optic 104. Further, each of the detectors 302 outputs a pulse signal having a pulse height corresponding to the energy of the measured fluorescent X-rays. In the example illustrated in FIG. 3(a), the X-ray irradiation width in the direction orthogonal to the X-ray irradiation direction is 60 mm or more on the surface of the sample. The region irradiated at a certain extent of X-ray intensities is long in the y-axis direction, and the three detectors 302 are thus arranged in a row in the y-axis direction. As a result, the fluorescent X-rays from a plurality of positions can be detected simultaneously, specifically, the fluorescent X-rays from three positions in the example illustrated in FIG. 3(a) can be detected simultaneously, thereby making it possible to greatly improve the throughput of the contamination analysis.

The counter counts the pulse signal output from the detector 302 based on the pulse height. Specifically, for example, the counter is a multi-channel analyzer, and counts the output pulse signal of the detector 302 for each channel corresponding to energy, and outputs the result as the intensities of the fluorescent X-rays. The detection unit 108 acquires the output of the counter as a spectrum.

Operations of the sample stage 106, the X-ray source 102, and the detection unit 108 are controlled by a control unit (not shown). Specifically, for example, the control unit is a personal computer. The control unit transmits and receives instruction commands to and from each of the components, to thereby control the operations of the sample stage 106, the X-ray source 102, and the detection unit 108. Moreover, the control unit analyzes the sample 110 based on the spectrum output by the detection unit 108.

As described above, in this embodiment, the primary X-rays are generated from the region having a certain length in the y-axis direction. Thus, it is possible to increase the total intensities of the primary X-rays generated by the X-ray source 102. Moreover, as illustrated in FIG. 3(a), the wide range on the sample can be irradiated with the primary X-rays having the particular intensities through use of the reflective optic 104 that is wide in the y-axis direction for the X-rays generated from the region having the certain length, and the total intensities of the X-rays with which the sample is irradiated can further be increased. The primary X-rays with which a point on the sample 110 corresponding to a center of a field of view for the detection by each detector 302 is irradiated are schematically illustrated in FIG. 3(a), but a continuous region which is long in the y-axis direction is irradiated with the X-rays in reality.

Moreover, the primary X-rays are emitted from a limited region on the xz plane, to be precise, the X-ray source 102 can be considered as a point light source on the xz plane. Thus, as illustrated in FIG. 3(b), the component of the primary X-rays diverging in the xz plane can be focused by the reflective optic 104 having the curved surface in the irradiation direction. Accordingly, intensities per unit area of the primary X-rays with which the surface of the sample 110 can be increased.

As the intensities of the primary X-rays with which the sample 110 is irradiated become higher, intensities of the fluorescent X-rays generated from the sample 110 become higher. According to this embodiment, it is possible to improve analysis sensitivity and shorten a measurement time by not only increasing the intensities per unit area of the primary X-rays with which the surface of the sample 110 is irradiated, but also increasing the area on the sample irradiated at these increased intensities.

Figure 4:
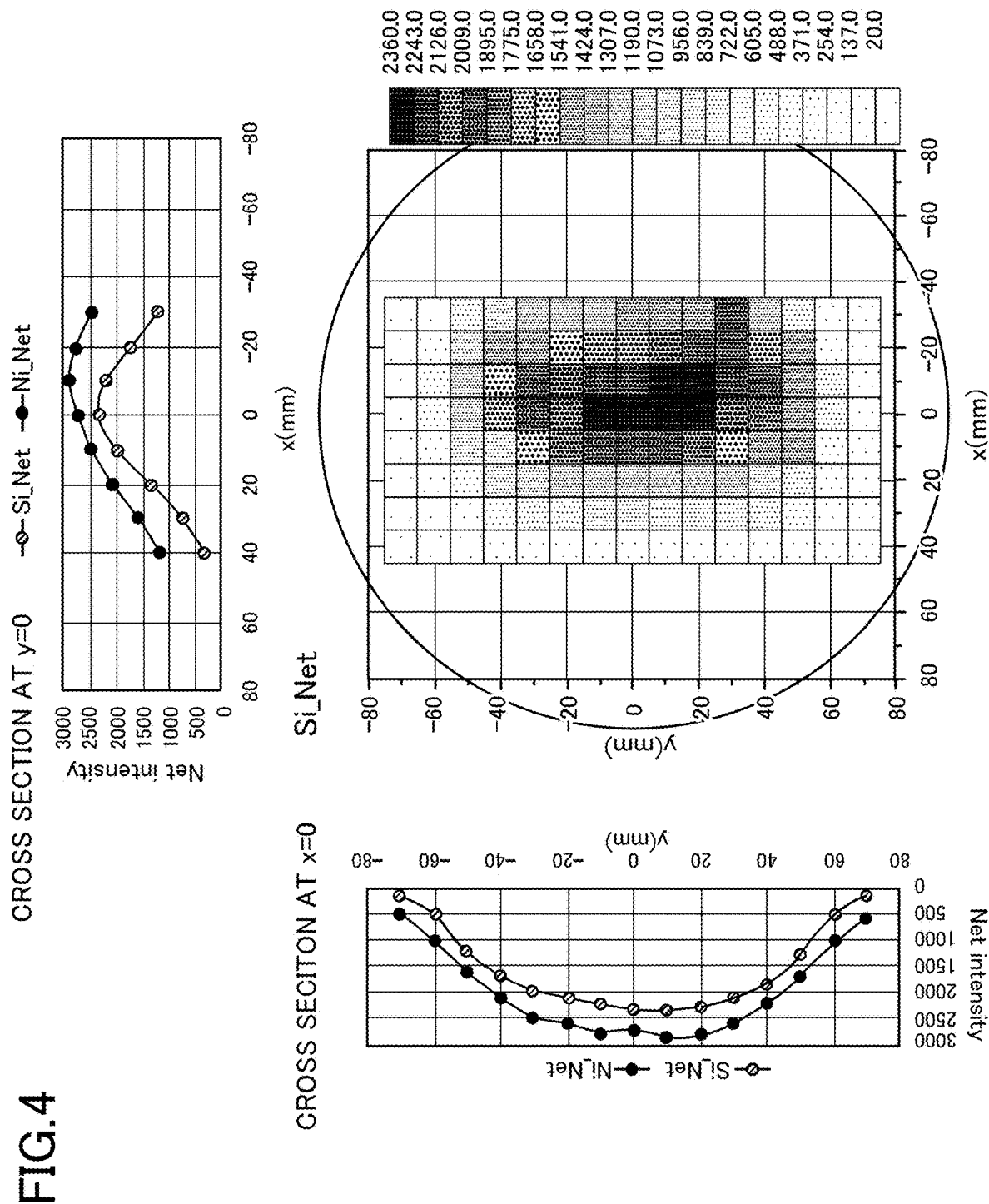
FIG. 4 is a graph showing an example of an experimental result.
Figure 5:
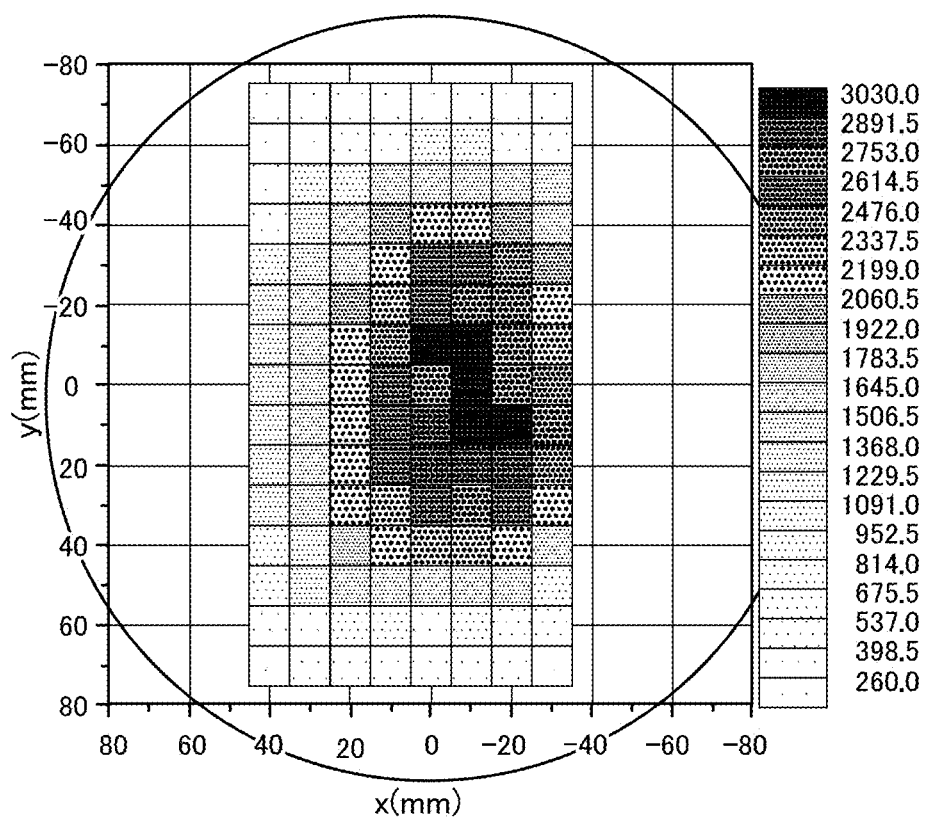
FIG. 5 is a graph showing an example of the experimental result.

Description will now be given of effects of this embodiment, together with experimental results. The sample 110 is a silicon wafer, to which Ni adheres as an impurity in a small amount, at the center portion of the substrate. The substrate is arranged so that a center of the irradiation region of the primary X-rays is located at the center of the silicon wafer. The primary X-rays reflected by the reflective optic 104 irradiate the substrate at an incident angle of 0.1 degrees with respect to the surface of the substrate. FIG. 4 and FIG. 5 are graphs showing distributions of net intensities of Si-Kα line (FIG. 4) and Ni-Kα line (FIG. 5) measured under these measurement conditions. A circular line indicates a contour of a silicon wafer having a diameter of 8 inches for reference. The primary X-rays enter from the minus "x" direction, and are focused about a line of x=0. A graph on the left side of FIG. 4 is a graph showing intensity distributions on a cross section at x=0 of the Si-Kα line and the Ni-Kα line. A graph on an upper side is a graph showing intensity distributions on a cross section at y=0.

As shown in FIG. 4 and FIG. 5, the primary X-rays were focused in the narrow region in the x-axis direction by the reflective optic 104, thereby making it possible to achieve the high fluorescent X-ray intensities. Further, the X-ray source 102 includes the electron beam source 202 which is long in the y-axis direction. By including the electron beam source 202, the X-ray source 102 has the electron beam focal point 201 that is long in the y-axis direction, thereby making it possible to achieve the high fluorescent X-ray intensities in the wide region in the y-axis direction. Specifically, fluorescent X-rays having intensities sufficient for the analysis were measured in a region which is 30 mm in the x-axis direction, is 80 mm in the y-axis direction, and has a center at the center of the substrate. The fluorescent X-rays having the intensities sufficient for the analysis are suitably set in accordance with a purpose of the analysis and elements contained in the sample 110. In this example, a net intensity sufficient for analysis of Ni, being the impurity in the small amount, is set to 2,300.

The present invention can be variously modified without being limited to the above-mentioned example. The configuration of the total reflection X-ray fluorescence spectrometer 100 described above is described as one example, and the present invention is not limited thereto. The configuration described in the above-mentioned example may be replaced by a configuration that is substantially the same as the configuration described in the above-mentioned example, a configuration that exhibits the same action and effect as those of the configuration described in the above-mentioned example, or a configuration that achieves the same object as that of the configuration described in the above-mentioned example.

For example, in the above-mentioned embodiment, the case in which the three detectors 302 are arranged in a row in the y-axis direction is described, but the arrangement layout of the plurality of detectors 302 is not limited to this case. FIG. 6(a) to FIG. 6(k) are diagrams illustrating modification examples of the arrangement layout of the detectors 302 as viewed from above the sample 110, similarly to FIG. 3(a). Each circle in FIG. 6(a) to FIG. 6(k) indicates a detection region of one detector 302. Moreover, a left-and-right direction of the diagrams of FIG. 6(a) to FIG. 6(k) is the x-axis direction. An up-and-down direction of the diagrams thereof is the y-axis direction.

Figure 6:
FIGS. 6 are diagrams illustrating arrangement layouts of detectors.
Figure 6:
Figure 6:
Figure 6:
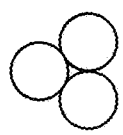
Figure 6:
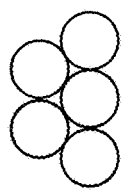
Figure 6:
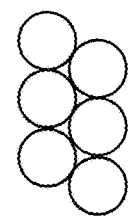
Figure 6:
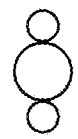
Figure 6:
Figure 6:
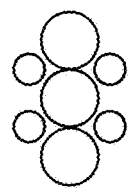
Figure 6:
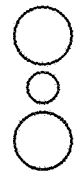
Figure 6:
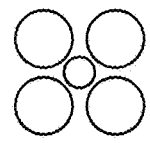

Specifically, for example, as illustrated in FIG. 6(a) to FIG. 6(c), the number of detectors 302 arranged in a row in the y-axis direction may be any one of two to four. Moreover, the number may be four or more.

Moreover, as illustrated in FIG. 6(d) to FIG. 6(f), the detectors 302 may be arranged in two rows in the x-axis direction. In these cases, gaps between the detection regions can be reduced by arranging the detectors 302 in a row on the left side of the diagram, and the detectors 302 in a row on the right side thereof, so as to be shifted from each other by a half of the size of the detector 302 in the y-axis direction. The detectors 302 may be arranged in two or more rows in the x-axis direction.

Moreover, the plurality of detectors 302 may include detectors 302 having different characteristics. Specifically, for example, the characteristics that may differ are the detection area, an energy resolution, a spatial resolution, or energy sensitivity. As illustrated in FIG. 6(g) to FIG. 6(k), the plurality of detectors 302 may include detectors 302 (large circles of the diagrams) having a large detection area and a high sensitivity, but having a low energy resolution and a low spatial resolution and detectors 302 (small circles of the diagrams) having a small detection area and low sensitivity, but having a high energy resolution and a high spatial resolution. Moreover, the plurality of detectors 302 may include detectors having high energy sensitivity for X-rays having high energy and detectors having high energy sensitivity for X-rays having low energy.

In the example illustrated in FIG. 6(g), the detector 302 having a large detection area is arranged at a center, and the detectors 302 each having a small detection area are arranged on both sides in the y-axis direction. In the example illustrated in FIG. 6(h), the detector 302 having a large detection area is arranged at a center, and the detectors 302 each having a small detection area are arranged at four locations in oblique directions. In the example illustrated in FIG. 6(i), three detectors 302 each having a large detection area are arranged in a row in the y-axis direction, and the detectors 302 each having a small detection area are arranged at the four locations in the oblique directions with respect to the detector 302 arranged at the center. In the example illustrated in FIG. 6(j), the detector 302 having a small detection area is arranged at a center, and the detectors 302 each having a large detection area are arranged on both sides in the y-axis direction. In the example illustrated in FIG. 6(k), the detector 302 having a small detection area is arranged at a center, and the detectors 302 each having a large detection area are arranged at four locations in oblique directions.

As described above, it is preferred that the detectors 302 be arranged so that the overall detection region formed by the plurality of detectors 302 covers the region from which the fluorescent X-rays having the intensities that are sufficient for the execution of the analysis are emitted. For example, it is preferred that the plurality of detectors 302 be arranged line-symmetrically with respect to a line which serves as a symmetry axis, passes through the center of the reflective optic 104, and is parallel to the irradiation direction. With the X-ray source 102 and the reflective optic 104 having the above-mentioned configuration, the primary X-rays irradiate the line-symmetrical region with respect to this symmetry axis of the sample 110. Thus, in the examples illustrated in FIG. 6(a) to FIG. 6(k) (except for FIG. 6(f)), the region which emits the fluorescent X-rays having the intensities that are sufficient for the execution of the analysis can be efficiently covered with the overall detection region formed by the plurality of detectors 302.

Reference Signs List 100 total reflection X-ray fluorescence spectrometer, 102 X-ray source, 104 reflective optic, 106 sample stage, 108 detection unit, 110 sample, 201 electron beam focal point, 202 electron beam source, 203 electron beam, 204 target, 205 primary X-ray, 208 power supply, 302 detector

The Invention claimed is:

1. A total reflection X-ray fluorescence spectrometer, comprising:
   an X-ray source that has an electron beam focal point having an effective width in a direction parallel to a surface of a sample, and orthogonal to an X-ray irradiation direction, that is larger than a dimension in the X-ray irradiation direction;
   a reflective optic that has an effective width in the direction parallel to the surface of the sample, and orthogonal to the X-ray irradiation direction, that is larger than the effective width of the electron beam focal point, and has a curved cross section in a plane containing the X-ray irradiation direction and being perpendicular to the surface of the sample; and a plurality of detectors that are directed toward the surface of the sample, are arranged in a row in the direction orthogonal to the X-ray irradiation direction, and are configured to measure intensities of fluorescent X-rays generated from the sample irradiated with X-rays focused by the reflective optic.

2. The total reflection X-ray fluorescence spectrometer according to claim 1, wherein the X-ray irradiation width in the direction orthogonal to the X-ray irradiation direction on the surface of the sample is 60 mm or larger.

3. The total reflection X-ray fluorescence spectrometer according to claim 1, wherein the effective width of the reflective optic in the direction parallel to the surface of the sample and orthogonal to the X-ray irradiation direction is 30 mm or larger.

4. The total reflection X-ray fluorescence spectrometer according to claim 1, wherein the effective width of the electron beam focal point in the direction parallel to the surface of the sample and orthogonal to the X-ray irradiation direction is 15 mm or larger.

5. The total reflection X-ray fluorescence spectrometer according to claim 1, wherein the cross section of a reflection surface of the reflective optic in the direction parallel to the surface of the sample and orthogonal to the X-ray irradiation direction is linear.

6. The total reflection X-ray fluorescence spectrometer according to claim 1, wherein the plurality of detectors include detectors having different characteristics.

7. The total reflection X-ray fluorescence spectrometer according to claim 6, wherein the different characteristics are a detection area, an energy resolution, a spatial resolution, or energy sensitivity.

8. The total reflection X-ray fluorescence spectrometer according to claim 1, wherein the plurality of detectors are arranged symmetrically with respect to the plane containing the X-ray irradiation direction and being perpendicular to the surface of the sample.

\* \* \* \* \*